United States Patent
Lee et al.

(10) Patent No.: US 7,596,317 B2
(45) Date of Patent: Sep. 29, 2009

(54) LONG-REACH WAVELENGTH DIVISION MULTIPLEXING PASSIVE OPTICAL NETWORKS BY USING THE POSITION ADJUSTMENT OF BROADBAND LIGHT SOURCE

(75) Inventors: Chang-Hee Lee, Daejeon (KR); Sang-Mook Lee, Daejeon (KR); Min-Hwan Kim, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 314 days.

(21) Appl. No.: 11/747,164

(22) Filed: May 10, 2007

(65) Prior Publication Data
US 2007/0206948 A1    Sep. 6, 2007

Related U.S. Application Data

(63) Continuation of application No. PCT/KR2006/003075, filed on Aug. 4, 2006.

(30) Foreign Application Priority Data

Aug. 9, 2005 (KR) .................. 10-2005-0072707

(51) Int. Cl.
   *H04J 14/00* (2006.01)
(52) U.S. Cl. .............. 398/67; 398/68; 398/70; 398/71; 398/72
(58) Field of Classification Search ............ 398/66–68, 398/70–72, 82, 165, 167.5
See application file for complete search history.

(56) References Cited

U.S. PATENT DOCUMENTS 7,073,956 B1 * 7/2006 Shin et al. .............. 385/89
7,171,123 B2 * 1/2007 Lee et al. ............... 398/82
7,340,170 B2 * 3/2008 Park et al. ............... 398/67
7,349,631 B2 * 3/2008 Lee et al. ............... 398/82
2005/0074240 A1   4/2005 Jung et al.
2005/0141892 A1   6/2005 Park et al.

FOREIGN PATENT DOCUMENTS

EP      1435701 A2      7/2004
KR  10-2005-0010101 A   1/2005

OTHER PUBLICATIONS

International Search Report dated Dec. 1, 2006 in PCT Application PCT/KR2006/003075, which is the parent application of this application.

* cited by examiner

*Primary Examiner*—Dalzid Singh
(74) *Attorney, Agent, or Firm*—Knobbe Martens Olson & Bear LLP

(57) ABSTRACT

An optical network system includes a central office (CO) comprising an A-band BLS to be injected into a light source for downstream signals, an A-band BLS coupling device for coupling the A-band BLS, a first wavelength-division multiplexer/demultiplexer connected to the A-band BLS coupling device for multiplexing/demultiplexing, and a plurality of first optical transceivers connected to the first wavelength-division multiplexer/demultiplexer; a remote node (RN) comprising a B-band BLS coupling device and a second wavelength-division multiplexer/demultiplexer connected to the B-band BLS coupling device for multiplexing/demultiplexing, and being connected to the CO through an optical fiber; and a plurality of optical network terminations (ONTs) including a plurality of second optical transceivers connected to the second wavelength-division multiplexer/demultiplexer, wherein either the RN or one of the plurality of ONTs further includes a B-band BLS to be injected to a light source for upstream signals.

20 Claims, 2 Drawing Sheets

LONG-REACH WAVELENGTH DIVISION MULTIPLEXING PASSIVE OPTICAL NETWORKS BY USING THE POSITION ADJUSTMENT OF BROADBAND LIGHT SOURCE

CROSS-REFERENCE TO RELATED PATENT APPLICATIONS

This application is a continuation application under 35 U.S.C. § 365(c) of International Application No. PCT/KR2006/003075, filed Aug. 4, 2006 designating the United States. International Application No. PCT/KR2006/003075 was published in English as WO2007/018378 A1 on Feb. 15, 2007. This application further claims the benefit of the earlier filing dates under 35 U.S.C. § 365(b) of Korean Patent Application No. 10-2005-00072707 filed Aug. 9, 2005. This application incorporates herein by reference the International Application No PCT/KR2006/003075 including the International Publication No. WO2007/018378 A1 and the Korean Patent Application No. 10-2005-00072707 in their entirety.

BACKGROUND

1. Technical Field

The present disclosure relates to a wavelength division multiplexing passive optical network (WDM-PON) for long-reach transmission using a position adjustment of a broadband light source (BLS). More specifically, the present disclosure relates to a WDM-PON which extends a transmission distance of the WDM-PON by adjusting a position of a BLS so as to procure a high quality of service (QoS) and to reduce transmission costs in an optical network.

2. Discussion of the Related Technology

Demand on a wider bandwidth per each subscriber is increased as voice and text oriented services have evolved to video based services due to a rapid expansion of Internet. To meet this demand, a study on passive optical network (PON) technologies based on optical fiber has actively carried out. The PON technologies are classified as a time division multiplexing passive optical network (TDM-PON) and a WDM-PON.

Generally, a maximum transmission distance between a central office (CO) and each subscriber in a PON is limited to be 20 Km. However, if a long-reach transmission is possible from CO to each subscriber, a region to be serviced by one CO can be increased greatly. For example, when extending the maximum transmission distance of a PON to 60 Km, it is possible to provide services for a certain area by using only one CO, while the same area may be provided with services by using 9 COs when using a PON having a maximum transmission distance of 20 Km. In this case, because signals can be transmitted through optical fibers from a subscriber to CO, a metro network and any equipments for a metro network provided between a subscriber and CO can be removed and thus it is possible to procure a high QoS of signals easily.

Therefore, when using a PON capable of a long-reach transmission, it is possible to reduce the number of CO greatly in a whole optical network. As a result, it is possible to reduce the costs for provision since a large area for installing CO is not required and the number of equipments to be provided for CO decreased. Further, it is possible to enhance QoS of signals provided for a subscriber because information can be possibly transmitted by a single hop from a subscriber to CO.

In addition, in case of a metropolis, it is possible to provide a high quality of services having a wide bandwidth stably by installing a CO at the suburbs of the metropolis without need of installing several COs compactly in a central area thereof and by connecting the installed CO to each subscriber located at an inner area of the metropolis using a PON capable of a long-reach transmission.

Due to the advantages described above, a PON capable of a long-reach transmission may reduce the initial installation costs of an optical network greatly, increase QoS of signals by decreasing the number of hops, and reduce the maintenance costs for maintaining the optical network.

In a TDM-PON having the above advantages, studies on extension of a transmission distance from CO to each subscriber are published in recent articles by D. Nesset, et al., entitled "Demonstration of 100 km Reach Amplified PONs with Upstream Bit-rates of 2.5 Gb/s and 10 Gb/s," in Proc. of ECOC 2004, paper We2.6.3, 2004 and by Giuseppe Talli, et al., entitled "Feasibility Demonstration of 100 km Reach DWDM Super PON with Upstream Bit Rates of 2.5 Gb/s and 10 Gb/s," in Proc. Conf. Optic. Fiber Commun. OFC 2005, paper OFI1, March, 2005.

However, it is inevitable to employ an optical amplifier between CO and a subscriber in order to compensate splitting loss in optical power splitters and loss in a long-reach optical fiber used for a TDM-PON. Further, in a TDM-PON, it is required to increase a transmission bit rate to guarantee a high bandwidth per subscriber and therefore a device for compensating dispersion of an optical fiber to accomplish a long-reach transmission. Using an optical amplifier and a device for compensating dispersion results in disadvantages that costs are increased in a PON and reliability of a system is decreased.

FIG. 1 illustrates a view of an exemplary WDM-PON for long-reach transmission. As illustrated in FIG. 1, the exemplary WDM-PON uses, as its light source, wavelength-locked Fabry-Perot Laser Diode (F-P LD) 11a, 11b, 11c, 31a, 31b, and 31c which have been suggested in Korean Registered Patent No. 325687 entitled "A light source for WDM-PON using a wavelength-locked Fabry-Perot laser diode by an injected broadband light source" (hereinafter referred to "'687 Patent"). In case of BLS 13 for upstream signals, loss due to optical fiber 40 positioned between CO 10 and optical network termination (ONT) 30 is inevitably incurred because both BLS 13 for upstream signals and BLS 14 for downstream signals are positioned at CO 10 in the exemplary WDM-PON shown in FIG. 1. The content disclosed in '687 patent is incorporated by reference herein.

As described above, output power of BLS 13 for upstream signals must be increased as a transmission distance is increased, because BLS 13 for upstream signals positioned at CO 10 is injected into F-P LD 31a, 31b, and 31c positioned at ONT 30 after undergoing loss of optical fiber 40. However, there are some disadvantages that the costs for BLS are sharply increased and embodying BLS becomes difficult, as the output power is increased. In addition, it is not easy to handle the high power BLS.

The discussion in this section is to provide general background information, and does not constitute an admission of prior art.

SUMMARY

An aspect of the invention provides an optical network system comprising: a central office (CO) comprising: an A-band broadband light source (BLS), an A-band BLS coupling device connected to the A-band BLS, a first wavelength-division multiplexer/demultiplexer connected to the A-band BLS coupling device, and a plurality of first optical transceivers connected to the first wavelength-division multiplexer/demultiplexer; a remote node (RN) comprising: a B-band BLS, a B-band BLS coupling device connected to the B-band BLS, and a second wavelength-division multiplexer/demultiplexer connected to the B-band BLS coupling device, wherein the RN is connected to the CO through an optical fiber; and a plurality of optical network terminations (ONTs) comprising a plurality of second optical transceivers connected to the second wavelength-division multiplexer/demultiplexer, wherein the A-band BLS is configured to generate light to be used in a downstream signal from the CO to the RN, and wherein the B-band BLS is configured to generate light to be used in an upstream signal from the RN to the CO.

In the foregoing system, the CO may comprise a Fabry-Perot Laser Diode (F-P LD) or a semiconductor optical amplifier, and wherein each of the plurality of ONTs may comprise a Fabry-Perot Laser Diode (F-P LD) or a semiconductor optical amplifier. The F-P LD may comprise anti-reflection coating. Each of the light from the A-band BLS and the light from the B-band BLS may comprise incoherent light, and wherein a frequency difference between two neighboring lasing modes in the F-P LD may be smaller than frequency difference between two neighboring channels of the incoherent light. Each of the light from the A-band BLS and the light from the B-band BLS may comprise incoherent light, wherein a frequency difference between two neighboring lasing modes of the F-P LD may be equal to n times of frequency difference of two neighboring channels of the incoherent light, and wherein n is a natural number. Each of the A-band BLS and the B-band BLS may be one selected from the group consisting of a light emitting diode (LED), an amplified spontaneous emission (ASE), a super luminescent diode (SLD) and a semiconductor laser. Each of the first wavelength-division multiplexer/demultiplexer and the second wavelength-division multiplexer/demultiplexer may comprise either an arrayed waveguide grating (AWG) or a thin-film filter.

Still in the foregoing system, wherein the A-band BLS coupling device may comprise a first optical circulator, a first band separating wavelength division multiplexer and a second band separating wavelength division multiplexer, wherein the first optical circulator may be configured to receive the light from A-band BLS and output the light toward the first band separating wavelength division multiplexer, and configured to receive wavelength-locked A-band downstream signals from the first band separating wavelength division multiplexer and output the wavelength-locked A-band downstream signals toward the second band separating wavelength division multiplexer, wherein the first band separating wavelength division multiplexer may be configured to receive the light from the first optical circulator and output the light toward the first wavelength-division multiplexer/demultiplexer, configured to receive the wavelength-locked A-band downstream signals from the first wavelength-division multiplexer/demultiplexer and output the wavelength-locked A-band downstream toward the first optical circulator, and configured to receive B-band upstream signals transmitted from the second band separating wavelength division multiplexer and output the B-band upstream signals toward the first wavelength-division multiplexer/demultiplexer, and wherein the second band separating wavelength division multiplexer may be configured to receive the wavelength-locked A-band downstream signals from the first optical circulator and output the wavelength-locked A-band downstream signals toward the RN, and configured to receive the B-band upstream signals transmitted from the RN and output the B-band upstream signals toward the first band separating wavelength division multiplexer. The B-band BLS coupling device may comprise a second optical circulator, a third band separating wavelength division multiplexer and a fourth band separating wavelength division multiplexer, wherein the second optical circulator may be configured to receive the light from the B-band BLS and output the light toward the fourth band separating wavelength division multiplexer, and configured to receive wavelength-locked B-band upstream signals from the fourth band separating wavelength division multiplexer and output the wavelength-locked B-band upstream signals toward the third band separating wavelength division multiplexer, wherein the third band separating wavelength division multiplexer may be configured to receive the wavelength-locked B-band upstream signals from the second optical circulator and output the wavelength-locked B-band upstream signals toward the CO, and configured to receive the A-band downstream signals transmitted from the CO and output the A-band downstream signals toward the fourth band separating wavelength division multiplexer, and wherein the fourth band separating wavelength division multiplexer may be configured to receive the light from the second optical circulator and output the light toward the second wavelength-division multiplexer/demultiplexer, configured to receive the wavelength-locked B-band upstream signals from the second wavelength-division multiplexer/demultiplexer and output the wavelength-locked B-band upstream signals toward the second optical circulator, and configured to receive A-band downstream signals transmitted from the third band separating wavelength division multiplexer and output the A-band downstream signals toward the second wavelength-division multiplexer/demultiplexer. The CO may comprise either an arrayed waveguide grating (AWG) or a thin-film filter connected to the A-band BLS coupling device, and wherein the RN comprises either an arrayed waveguide grating (AWG) or a thin-film filter connected to the B-band BLS coupling device. The plurality of first optical transceivers and the plurality of second optical transceivers may be configured to use an error correction code.

In another aspect of the invention provides an optical network system comprising: a central office (CO) comprising an A-band broadband light source (BLS), an A-band BLS coupling device connected to the A-band BLS, a first wavelength-division multiplexer/demultiplexer connected to the A-band BLS coupling device, and a plurality of first optical transceivers connected to the first wavelength-division multiplexer/demultiplexer; a remote node (RN) comprising a B-band BLS coupling device, and a second wavelength-division multiplexer/demultiplexer connected to the B-band BLS coupling device, wherein the RN is connected to the CO through an optical fiber; a plurality of optical network terminations (ONTs) comprising a plurality of second optical transceivers connected to the second wavelength-division multiplexer/demultiplexer; and a B-band BLS located in one of the plurality of ONTs, wherein the B-ban BLS coupling device is connected to the B-band BLS, wherein the A-band BLS is configured to generate light to be used in a downstream signal from the CO to the RN, and wherein the B-band BLS is configured to generate light to be used in an upstream signal from the RN to the CO.

In the foregoing system, the CO may comprise a Fabry-Perot Laser Diode (F-P LD) or a semiconductor optical amplifier, and wherein each of the plurality of ONTs may comprise a Fabry-Perot Laser Diode (F-P LD) or a semiconductor optical amplifier. The F-P LD may comprise anti-reflection coating. Each of the light from the A-band BLS and the light from the B-band BLS may comprise incoherent light, and wherein a frequency difference between two neighboring lasing modes in the F-P LD may be smaller than frequency difference between two neighboring channels of the incoherent light. Each of the light from the A-band BLS and the light from the B-band BLS may comprise incoherent light, wherein a frequency difference between two neighboring lasing modes of the F-P LD may be equal to n times of frequency difference of two neighboring channels of the incoherent light, and wherein n is a natural number. Each of the A-band BLS and the B-band BLS may be one selected from the group consisting of a light emitting diode (LED), an amplified spontaneous emission (ASE), a super luminescent diode (SLD) and a semiconductor laser. Each of the first wavelength-division multiplexer/demultiplexer and the second wavelength-division multiplexer/demultiplexer may comprise either an arrayed waveguide grating (AWG) or a thin-film filter. The CO may comprise either an arrayed waveguide grating (AWG) or a thin-film filter connected to the A-band BLS coupling device, and wherein the RN may comprise either an arrayed waveguide grating (AWG) or a thin-film filter connected to the B-band BLS coupling device. The plurality of first optical transceivers and the plurality of second optical transceivers may be configured to use an error correction code The aspect of the present invention is to provide a WDM-PON for long-reach transmission capable of procuring QoS economically and stably without employing an optical amplifier and a dispersion compensation device by positioning BLS for upstream signals at ONT in a WDM-PON system which uses injection of spectrum-sliced BLS so that limitation to a transmission distance due to the decrease of optical power of the injected BLS is mitigated.

Aspect of the present invention provides a wavelength-division multiplexing passive optical network for long-reach transmission using a position adjustment of a broadband light source (BLS) comprising a central office (CO) comprising an A-band BLS to be injected into a light source for downstream signals, an A-band BLS coupling device for coupling the A-band BLS, a first wavelength-division multiplexer/demultiplexer connected to the A-band BLS coupling device for multiplexing/demultiplexing, and a plurality of first optical transceivers connected to the first wavelength-division multiplexer/demultiplexer; a remote node (RN) comprising a B-band BLS coupling device and a second wavelength-division multiplexer/demultiplexer connected to the B-band BLS coupling device for multiplexing/demultiplexing, and being connected to the CO through an optical fiber; and a plurality of optical network terminations (ONTs) including a plurality of second optical transceivers connected to the second wavelength-division multiplexer/demultiplexer, wherein either the RN or one of the plurality of ONTs further includes a B-band BLS to be injected to a light source for upstream signals.

Further features and advantages of the present invention can be obviously understood with reference to the accompanying drawings where same or similar reference numerals indicate same components.

In a WDM-PON for long-reach transmission using a position adjustment of BLS according to an embodiment of the present invention, it is possible to embody a WDM-PON capable of a long-reach transmission economically without employing an optical amplifier and a device for compensating dispersion by positioning BLS for upstream signals at ONT in a WDM-PON system which uses injection of spectrum-sliced BLS so that limitation to a transmission distance due to the decrease of optical power of the injected BLS is solved. In addition, a WDM-PON for long-reach transmission according to an embodiment of the present invention greatly increases the area to be serviced by one optical network.

Further, it is possible to decrease initial installation costs of a system by reducing greatly the number of COs in a whole optical network and increase may reduce the initial installation costs of an optical network greatly, increase QoS of signals by decreasing the number of hops.

Moreover, in a WDM-PON for long-reach transmission using a position adjustment of BLS according to an embodiment of the present invention, it is possible to provide a high quality of services having a wide bandwidth stably with low installation investment costs by installing a CO at the suburbs of a metropolis without need of installing several COs compactly in a central area thereof and by connecting the installed CO to each subscriber located at an inner area of the metropolis using a PON for long-reach transmission.

DETAILED DESCRIPTION OF EMBODIMENTS

Hereinafter, embodiments of the present invention are described in more detail with reference to the appended drawings.

Figure 1:
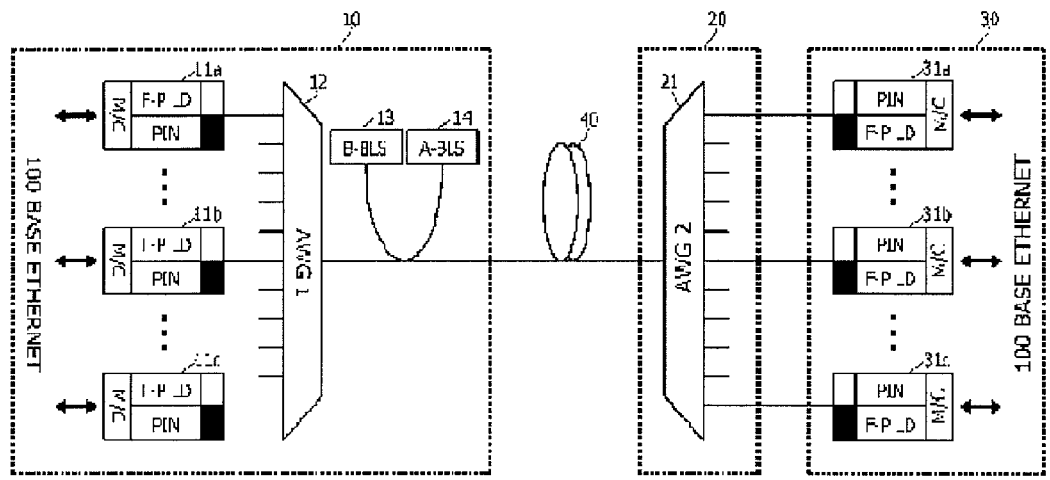
FIG. 1 illustrates a view of an exemplary WDM-PON for long-reach transmission.
Figure 2:
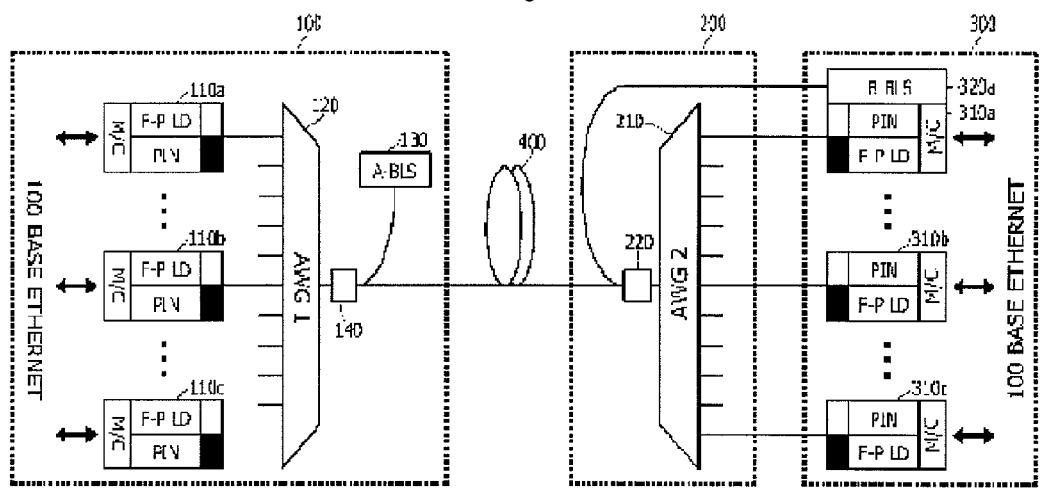
FIG. 2 illustrates a view of WDM-PON for long-reach transmission in accordance with an embodiment of the present invention where BLS is positioned at a subscriber end.

FIG. 2 illustrates a view of WDM-PON for long-reach transmission in accordance with an embodiment of the present invention where BLS is positioned at a subscriber end. As illustrated in FIG. 2, a WDM-PON for long-reach transmission where BLS is positioned at ONT mainly comprises CO 100, Remote Node (RN) 200 and a plurality of ONTs 300.

CO 100 further comprises A-band BLS 130 to be injected into a light source for downstream signals, A-band BLS coupling device 140 for coupling the A-band BLS, a first wavelength-division multiplexer/demultiplexer 120 connected to the A-band BLS coupling device 140 for multiplexing/demultiplexing, and optical transceivers 110a, 110b, and 110c connected to the first wavelength-division multiplexer/demultiplexer 120. Further, B-band BLS may be included in at least one adjacent CO for the purpose of system protection.

RN 200 includes B-band BLS coupling device 220 for coupling B-band BLS 320a and a second wavelength-division multiplexer/demultiplexer 210 connected to the B-band BLS coupling device 220 for multiplexing/demultiplexing, and is connected to the CO 100 through an optical fiber 400.

A plurality of ONTs 300 includes optical transceivers 310a, 310b, and 310c connected to the second wavelength-division multiplexer/demultiplexer 210. At least one of the plurality of ONTs 300 may further include B-band BLS 320a.

In addition, a wavelength-locked F-P LD by a BLS being injected from outside as suggested in '687 patent, or a semiconductor optical amplifier into which BLS is injected from outside may be used as a light source for upstream signals and downstream signals. The F-P LD, the wavelength of which is locked by a BLS being injected from outside, can be an anti-reflection coated F-P LD.

Further, a frequency spacing between two adjacent lasing modes of the F-P LD, the wavelength of which is locked by a BLS being injected from outside, is narrower than a channel spacing of incoherent light being injected from outside.

Moreover, in case that a frequency spacing between two adjacent lasing modes of the F-P LD, the wavelength of which is locked by a BLS being injected from outside, is n times of a channel spacing of incoherent light being injected from outside, n-numbered different ONTs are used where an oscillation wavelength of the F-P LD is regulated by controlling temperature thereof.

Light emitting diode (LED), amplified spontaneous emission (ASE), super luminescent diode (SLD) or semiconductor laser may be used as BLS.

Arrayed waveguide grating (AWG) or thin-film filter may be used as a first wavelength-division multiplexer/demultiplexer 120 and a second wavelength-division multiplexer/demultiplexer 210. In case of using AWG, bandwidth to be provided for a subscriber may be widened by using a different band in addition to A-band and B-band when using a periodic filtering characteristic of AWG.

An optical power splitter may be used as A-band BLS coupling device 140 and B-band BLS coupling device 220.

Error correction codes may be used for optical transceivers 110a, 110b, and 1110c connected to the first wavelength-division multiplexer/demultiplexer 120 and optical transceivers 310a, 310b, and 310c connected to the second wavelength-division multiplexer/demultiplexer 210.

Figure 3:
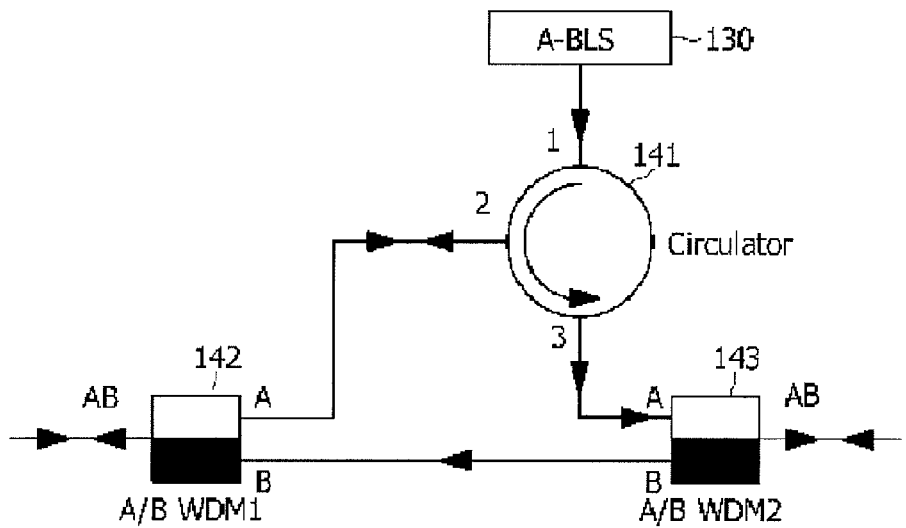
FIG. 3 illustrates a view of a coupling device in accordance with an embodiment of the present invention to connect A-band BLS positioned at CO to a system.

FIG. 3 illustrates a view of a coupling device in accordance with an embodiment of the present invention to connect A-band BLS positioned at CO to a system. As illustrated in FIG. 3, a coupling device for coupling A-band BLS positioned at CO to a system comprises an optical circulator 141 and two A/B-band separating wavelength division multiplexer (A/B WDM) 142, 143.

A-band BLS for downstream signals positioned at CO are inputted into terminal 1 of optical circulator 141 and are outputted from terminal 2 thereof. The output signals from terminal 2 of optical circulator 141 are inputted into terminal A of A/B WDM1 142 and are outputted to terminal AB thereof and then are inputted into the first wavelength-division multiplexer/demultiplexer 120. A-band downstream signals, each of which is wavelength-locked at CO, are multiplexed at the first wavelength-division multiplexer/demultiplexer 120 and are inputted into terminal AB of A/B WDM1 142 and then are outputted to terminal A thereof. After that, these downstream signals are inputted into terminal 2 of optical circulator 121 and pass both terminal 3 of optical circulator 121 and terminal A of A/B WDM2 143 and then are outputted to terminal AB of A/B WDM2 143. The output signals from terminal AB of A/B WDM2 143 are transmitted downstream.

B-band upstream signals transmitted from ONT are inputted into terminal AB of A/B WDM2 143 and are outputted to terminal B thereof. Then, the output signals from terminal B of A/B WDM2 143 are inputted into terminal B of A/B WDM1 142 and are outputted to terminal AB thereof. The output signals from terminal AB of A/B WDM1 142 are transmitted upstream.

Figure 4:
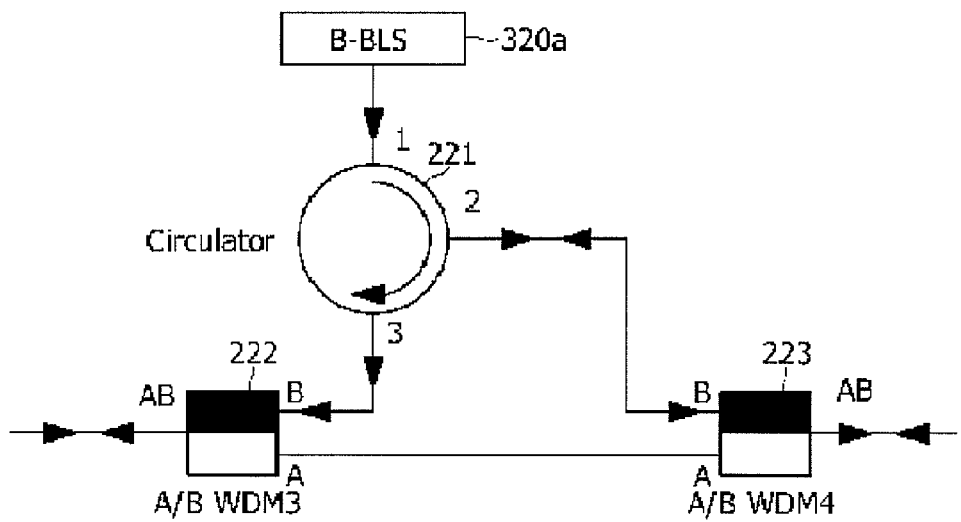
FIG. 4 illustrates a view of a coupling device in accordance with an embodiment of the present invention to connect B-band BLS positioned at a subscriber end to a system.

FIG. 4 illustrates a view of a coupling device in accordance with an embodiment of the present invention to connect B-band BLS positioned at a subscriber end to a system. As illustrated in FIG. 4, B-band BLS for upstream signals positioned at ONT are inputted into terminal 1 of optical circulator 221 and are outputted from terminal 2 thereof. The output signals from terminal 2 of optical circulator 221 are inputted into terminal B of A/B WDM4 223 and are outputted to terminal AB thereof and then are inputted into the second wavelength-division multiplexer/demultiplexer 210. B-band downstream signals, each of which is wavelength-locked at each subscriber end, are multiplexed at the second wavelength-division multiplexer/demultiplexer 210 and are inputted into terminal AB of A/B WDM4 223 and then are outputted to terminal B thereof. After that, these upstream signals are inputted into terminal 2 of optical circulator 221 and pass both terminal 3 of optical circulator 221 and terminal B of A/B WDM3 222 and then are outputted to terminal AB of A/B WDM3 222. The output signals from terminal AB of A/B WDM3 222 are transmitted upstream.

A-band downstream signals transmitted from CO are inputted into terminal AB of A/B WDM3 222 and are outputted to terminal A thereof. Then, the output signals from terminal A of A/B WDM3 222 are inputted into terminal A of A/B WDM4 223 and are outputted to terminal AB thereof. The output signals from terminal AB of A/B WDM4 223 are transmitted downstream. In the meantime, an optical circulator may be used as a BLS coupling device if a power margin of a system is enough.

Figure 5:
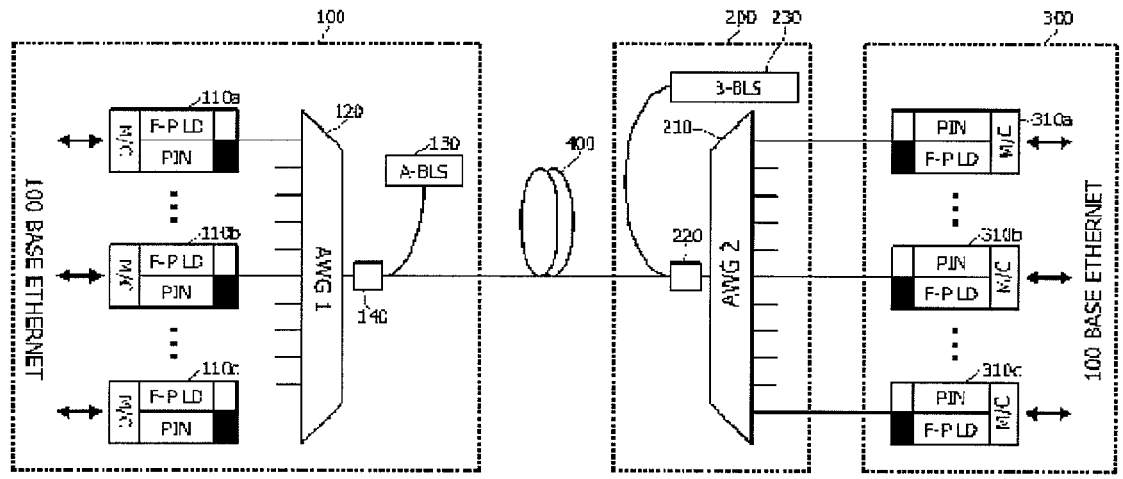
FIG. 5 illustrates a view of WDM-PON for long-reach transmission in accordance with an embodiment of the present invention where BLS is positioned at a remote node.

FIG. 5 illustrates a view of WDM-PON for long-reach transmission in accordance with an embodiment of the present invention where BLS is positioned at a remote node. As illustrated in FIG. 5, an alternative embodiment for embodying a WDM-PON for long-reach transmission can be shown as a configuration of WDM-PON where BLS for upstream signals is positioned at RN 200.

The remaining configuration of WDM-PON is substantially the same as the configuration of WDM-PON shown in FIG. 2, except the position of BLS for upstream signals. The embodiment shown in FIG. 5 may be preferably used when power is easily procured at an installation site of RN 200.

At least one adjacent RN 200 may be constructed in a near site of RN 200 and B-band BLS 230 may be further included in the adjacent RN 200. In addition, B-band BLS may be further included in an at least one adjacent RN for the purpose of system protection.

Figure 6:
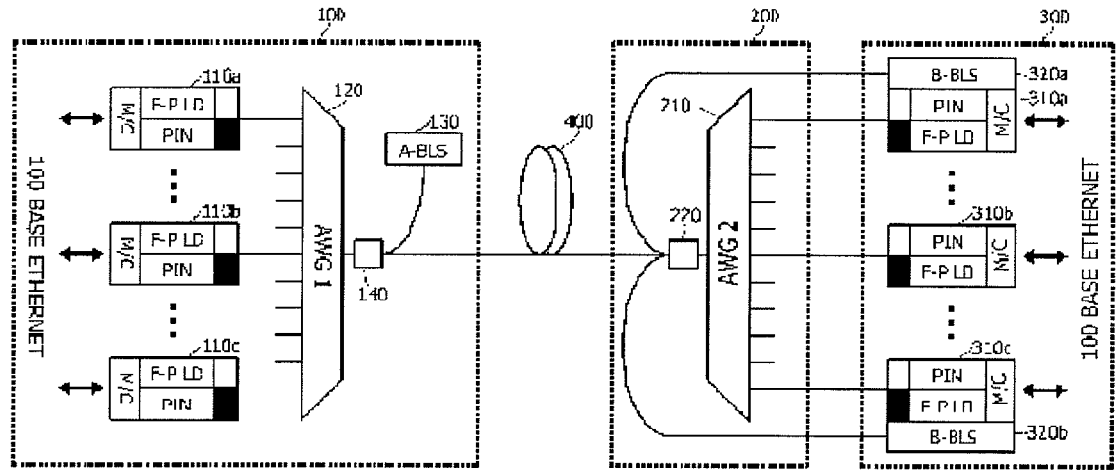
FIG. 6 illustrates a view of WDM-PON for long-reach transmission in accordance with an embodiment of the present invention where each BLS for upstream signals is positioned at two or more different subscribers.

FIG. 6 illustrates a view of WDM-PON for long-reach transmission in accordance with an embodiment of the present invention where each BLS for upstream signals is positioned at two or more different subscribers. As illustrated in FIG. 6, even if a supply of BLS is stopped due to interruption of electric power or cut-off of optical fiber at one subscriber where BLS for upstream signals is positioned, BLS positioned at a different subscriber can supply continuously BLS for upstream signals and thus can protect the system.

The following two methods may be used in a real running of BLS in terms of a protection function.

The first method is to run two or more BLSs at all times in normal circumstances. In this case, even when emergency at one site where a BLS is positioned occurs, it is possible to run the system by using another BLS positioned at a different site.

The second method is to run a single BLS only in normal circumstances and to monitor the single running BLS by using a monitoring control circuit. When running the single BLS is limited due to emergency, it is possible to run another BLS positioned at a different site.

When a frequency spacing between two adjacent lasing modes of the F-P LD, the wavelength of which is locked by a BLS being injected from outside, is narrower than a channel spacing of incoherent light being injected from outside, at least one or more lasing modes always exist within a channel band of incoherent light being injected even though an external environment may vary. Therefore, it is possible to embody a wavelength-independent ONT because a large output can be obtained when incoherent light is injected into the two adjacent lasing modes.

A frequency spacing between two adjacent lasing modes in F-P LD is determined by a cavity length thereof and a frequency spacing of each common mode is reversely proportional to a cavity length.

Accordingly, it is preferable that the cavity length of F-P LD always equals to or is longer than a cavity length value equal to the channel spacing of incoherent light being injected from outside, in order to embody a wavelength-independent ONT.

However, when the cavity length of F-P LD is lengthened, it is pretty much difficult to perform a packaging of laser.

As a solution to the above difficulty, it is possible to embody a wavelength-independent ONT when using F-P LD where a frequency spacing between two adjacent lasing modes in F-P LD is the same as the channel spacing of incoherent light being injected. That is, it is possible to use F-P LD at any wavelength (i.e., at any ONT) if an oscillation wavelength of F-P LD can be regulated to be one of wavelengths of incoherent light being injected by controlling the temperature thereof. In case that a frequency spacing between two adjacent lasing modes in F-P LD is n times of a channel spacing of incoherent light, n-numbered different ONTs are used.

In a WDM-PON for long-reach transmission using a position adjustment of BLS according to an embodiment of the present invention, it is possible to embody a WDM-PON capable of a long-reach transmission economically without employing an optical amplifier and a device for compensating color dispersion by positioning BLS for upstream signals at ONT in a WDM-PON system which uses injection of spectrum-sliced BLS so that limitation to a transmission distance due to the decrease of electrical power of the injected BLS is solved. In addition, a WDM-PON for long-reach transmission according to an embodiment of the present invention greatly increases the area to be serviced by one optical network. Further, it is possible to decrease initial installation costs of a system by reducing greatly the number of COs in a whole optical network and increase may reduce the initial installation costs of an optical network greatly, increase QoS of signals by decreasing the number of hops.

Moreover, in a WDM-PON for long-reach transmission using a position adjustment of BLS according to an embodiment of the present invention, it is possible to provide a high quality of services having a wide bandwidth stably with low installation investment costs by installing a CO at the suburbs of a metropolis without need of installing several COs compactly in a central area thereof and by connecting the installed CO to each subscriber located at an inner area of the metropolis using a PON for long-reach transmission.

As various modifications could be made in the constructions and method herein described and illustrated without departing from the scope of the present invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An optical network system comprising:
    a central office (CO) comprising:
        an A-band broadband light source (BLS),
        an A-band BLS coupling device connected to the A-band BLS,
        a first wavelength-division multiplexer/demultiplexer connected to the A-band BLS coupling device,
        and a plurality of first optical transceivers connected to the first wavelength-division multiplexer/demultiplexer;
    a remote node (RN) comprising:
        a B-band BLS,
        a B-band BLS coupling device connected to the B-band BLS, and
        a second wavelength-division multiplexer/demultiplexer connected to the B-band BLS coupling device,
        wherein the RN is connected to the CO through an optical fiber; and
    a plurality of optical network terminations (ONTs) comprising a plurality of second optical transceivers connected to the second wavelength-division multiplexer/demultiplexer,
    wherein the A-band BLS is configured to generate light to be used in a downstream signal from the CO to the RN, and wherein the B-band BLS is configured to generate light to be used in an upstream signal from the RN to the CO.

2. The system of claim 1, wherein the CO comprises a Fabry-Perot Laser Diode (F-P LD) or a semiconductor optical amplifier, and wherein each of the plurality of ONTs comprises a Fabry-Perot Laser Diode (F-P LD) or a semiconductor optical amplifier.

3. The system of claim 2, wherein the F-P LD comprises anti-reflection coating.

4. The system of claim 2, wherein each of the light from the A-band BLS and the light from the B-band BLS comprises incoherent light, and wherein a frequency difference between two neighboring lasing modes in the F-P LD is smaller than frequency difference between two neighboring channels of the incoherent light.

5. The system of claim 2, wherein each of the light from the A-band BLS and the light from the B-band BLS comprises incoherent light, wherein a frequency difference between two neighboring lasing modes of the F-P LD is equal to n times of frequency difference of two neighboring channels of the incoherent light, and wherein n is a natural number.

6. The system of claim 1, wherein each of the A-band BLS and the B-band BLS is one selected from the group consisting of a light emitting diode (LED), an amplified spontaneous emission (ASE), a super luminescent diode (SLD) and a semiconductor laser.

7. The system of claim 1, wherein each of the first wavelength-division multiplexer/demultiplexer and the second wavelength-division multiplexer/demultiplexer comprises either an arrayed waveguide grating (AWG) or a thin-film filter.

8. The system of claim 1, wherein the A-band BLS coupling device comprises a first optical circulator, a first band separating wavelength division multiplexer and a second band separating wavelength division multiplexer,
    wherein the first optical circulator is configured to receive the light from A-band BLS and output the light toward the first band separating wavelength division multiplexer, and configured to receive wavelength-locked A-band downstream signals from the first band separating wavelength division multiplexer and output the wavelength-locked A-band downstream signals toward the second band separating wavelength division multiplexer;

wherein the first band separating wavelength division multiplexer is configured to receive the light from the first optical circulator and output the light toward the first wavelength-division multiplexer/demultiplexer, configured to receive the wavelength-locked A-band downstream signals from the first wavelength-division multiplexer/demultiplexer and output the wavelength-locked A-band downstream toward the first optical circulator, and configured to receive B-band upstream signals transmitted from the second band separating wavelength division multiplexer and output the B-band upstream signals toward the first wavelength-division multiplexer/demultiplexer; and wherein the second band separating wavelength division multiplexer is configured to receive the wavelength-locked A-band downstream signals from the first optical circulator and output the wavelength-locked A-band downstream signals toward the RN, and configured to receive the B-band upstream signals transmitted from the RN and output the B-band upstream signals toward the first band separating wavelength division multiplexer.

9. The system of claim 1, wherein the B-band BLS coupling device comprises a second optical circulator, a third band separating wavelength division multiplexer and a fourth band separating wavelength division multiplexer, wherein the second optical circulator is configured to receive the light from the B-band BLS and output the light toward the fourth band separating wavelength division multiplexer, and configured to receive wavelength-locked B-band upstream signals from the fourth band separating wavelength division multiplexer and output the wavelength-locked B-band upstream signals toward the third band separating wavelength division multiplexer;

wherein the third band separating wavelength division multiplexer is configured to receive the wavelength-locked B-band upstream signals from the second optical circulator and output the wavelength-locked B-band upstream signals toward the CO, and configured to receive the A-band downstream signals transmitted from the CO and output the A-band downstream signals toward the fourth band separating wavelength division multiplexer; and wherein the fourth band separating wavelength division multiplexer is configured to receive the light from the second optical circulator and output the light toward the second wavelength-division multiplexer/demultiplexer, configured to receive the wavelength-locked B-band upstream signals from the second wavelength-division multiplexer/demultiplexer and output the wavelength-locked B-band upstream signals toward the second optical circulator, and configured to receive A-band downstream signals transmitted from the third band separating wavelength division multiplexer and output the A-band downstream signals toward the second wavelength-division multiplexer/demultiplexer.

10. The system of claim 1, wherein the CO comprises either an arrayed waveguide grating (AWG) or a thin-film filter connected to the A-band BLS coupling device, and wherein the RN comprises either an arrayed waveguide grating (AWG) or a thin-film filter connected to the B-band BLS coupling device.

11. The system of claim 1, wherein the plurality of first optical transceivers and the plurality of second optical transceivers are configured to use an error correction code.

12. An optical network system comprising:
a central office (CO) comprising:
an A-band broadband light source (BLS),
an A-band BLS coupling device connected to the A-band BLS,
a first wavelength-division multiplexer/demultiplexer connected to the A-band BLS coupling device, and
a plurality of first optical transceivers connected to the first wavelength-division multiplexer/demultiplexer;
a remote node (RN) comprising:
a B-band BLS coupling device, and
a second wavelength-division multiplexer/demultiplexer connected to the B-band BLS coupling device, wherein the RN is connected to the CO through an optical fiber;
a plurality of optical network terminations (ONTs) comprising a plurality of second optical transceivers connected to the second wavelength-division multiplexer/demultiplexer; and
a B-band BLS located in one of the plurality of ONTs, wherein the B-ban BLS coupling device is connected to the B-band BLS,
wherein the A-band BLS is configured to generate light to be used in a downstream signal from the CO to the RN, and wherein the B-band BLS is configured to generate light to be used in an upstream signal from the RN to the CO.

13. The system of claim 12, wherein the CO comprises a Fabry-Perot Laser Diode (F-P LD) or a semiconductor optical amplifier, and wherein each of the plurality of ONTs comprises a Fabry-Perot Laser Diode (F-P LD) or a semiconductor optical amplifier.

14. The system of claim 13, wherein the F-P LD comprises anti-reflection coating.

15. The system of claim 13, wherein each of the light from the A-band BLS and the light from the B-band BLS comprises incoherent light, and wherein a frequency difference between two neighboring lasing modes in the F-P LD is smaller than frequency difference between two neighboring channels of the incoherent light.

16. The system of claim 13, wherein each of the light from the A-band BLS and the light from the B-band BLS comprises incoherent light, wherein a frequency difference between two neighboring lasing modes of the F-P LD is equal to n times of frequency difference of two neighboring channels of the incoherent light, and wherein n is a natural number.

17. The system of claim 12, wherein each of the A-band BLS and the B-band BLS is one selected from the group consisting of a light emitting diode (LED), an amplified spontaneous emission (ASE), a super luminescent diode (SLD) and a semiconductor laser.

18. The system of claim 12, wherein each of the first wavelength-division multiplexer/demultiplexer and the second wavelength-division multiplexer/demultiplexer comprises either an arrayed waveguide grating (AWG) or a thin-film filter.

19. The system of claim 12, wherein the CO comprises either an arrayed waveguide grating (AWG) or a thin-film filter connected to the A-band BLS coupling device, and wherein the RN comprises either an arrayed waveguide grating (AWG) or a thin-film filter connected to the B-band BLS coupling device.

20. The system of claim 12, wherein the plurality of first optical transceivers and the plurality of second optical transceivers are configured to use an error correction code.

* * * * *